United States Patent
Jones

(10) Patent No.: US 9,538,733 B2
(45) Date of Patent: Jan. 10, 2017

(54) SUSTAINABLE AQUAPONIC SYSTEM AND METHOD FOR GROWING PLANTS LIKE MEDICAL CANNABIS

(71) Applicant: Trent Jones, Peru, IN (US)

(72) Inventor: Trent Jones, Peru, IN (US)

(*) Notice: Subject to any disclaimer, the term of this patent is extended or adjusted under 35 U.S.C. 154(b) by 1 day.

(21) Appl. No.: 14/629,231

(22) Filed: Feb. 23, 2015

(65) Prior Publication Data
US 2015/0296840 A1    Oct. 22, 2015

Related U.S. Application Data

(63) Continuation-in-part of application No. 14/051,060, filed on Oct. 10, 2013, now abandoned, which is a continuation-in-part of application No. 13/279,541, filed on Oct. 24, 2011, now abandoned.

(51) Int. Cl.

| | |
|---|---|
| *A01K 63/06* | (2006.01) |
| *A01K 61/00* | (2006.01) |
| *A01K 61/02* | (2006.01) |
| *A01K 63/04* | (2006.01) |
| *A01G 31/00* | (2006.01) |
| *A01K 63/00* | (2006.01) |

(52) U.S. Cl.
CPC .............. *A01K 63/06* (2013.01); *A01G 31/00* (2013.01); *A01K 61/02* (2013.01); *A01K 63/00* (2013.01); *A01K 63/04* (2013.01); *A01K 63/042* (2013.01); *A01K 63/065* (2013.01); *A23K 50/80* (2016.05); *Y02P 60/216* (2015.11); *Y02P 60/642* (2015.11)

(58) Field of Classification Search
CPC ...... A01K 61/00; A01K 61/006; A01K 63/00; A01K 63/06; A01K 63/065; A01K 63/042; Y02P 60/216; Y02P 60/64; Y02P 60/642; A01G 31/00; A23K 50/80
USPC ............... 119/215, 219, 221, 226, 227, 228, 229,119/260
See application file for complete search history.

(56) References Cited

U.S. PATENT DOCUMENTS

| | | | |
|---|---|---|---|
| 4,015,366 A * | 4/1977 | Hall, III | A01D 46/005 137/236.1 |
| 5,046,451 A | 9/1991 | Inslee et al. | 119/227 |
| 5,287,652 A | 2/1994 | Delp | 47/79 |
| 5,329,719 A * | 7/1994 | Holyoak | A01K 61/007 119/223 |

(Continued)

OTHER PUBLICATIONS

Denton, Tricia, et al. "Natural abundance of stable carbon and nitrogen isotopes in Cannabis sativa reflects growth conditions", Nov. 1, 2001, Australian Journal of Plant Physiology, vol. 21, pp. 1005-1012.

*Primary Examiner* — Monica Williams
*Assistant Examiner* — Michael Wang
(74) *Attorney, Agent, or Firm* — Clifford H. Kraft

(57) ABSTRACT

A system and method of sustainable aquaponics that vertically integrates unique aquaponic system designs with alternative aquaculture fish feed sources, fingerling production methods, alternative aquaculture/farmed fish grow out models, and green energy sources that yield organic produce in the form of fruits and vegetables. A raceway system serves as the hub for grow-out throughout the warm and cold months. During the summer months, fish can be spawned and fed for steady growth, while during the winter months, the fish continue to grow at slower quite acceptable growth rates. Plants like legal (licensed) cannabis for medical use can be grown in plant areas near the raceways with very high yields.

7 Claims, 4 Drawing Sheets

(56) References Cited

U.S. PATENT DOCUMENTS

| | | | |
|---|---|---|---|
| 7,467,601 B2 | 12/2008 | Brauman | 119/228 |
| 7,690,330 B2 | 4/2010 | Miller | 119/228 |
| 7,717,065 B2 | 5/2010 | McRobert | 119/226 |
| 8,141,515 B2 | 3/2012 | Nien | 119/226 |
| 8,181,391 B1 | 5/2012 | Giacomantonio | 47/62 R |
| 8,578,651 B1 * | 11/2013 | Giacomantonio | A01G 31/02 47/59 R |
| 9,113,601 B2 * | 8/2015 | Friton | A01G 9/023 |
| 2004/0107914 A1 | 6/2004 | Untermeyer et al. | 119/215 |
| 2005/0013664 A1 | 1/2005 | Boylan | 405/81 |
| 2005/0167347 A1 * | 8/2005 | Thomas | A01K 63/00 210/170.06 |
| 2006/0163131 A1 | 7/2006 | Kieselbach | 210/169 |
| 2009/0145368 A1 | 6/2009 | Brauman | 119/215 |
| 2010/0170450 A1 | 7/2010 | Bradley et al. | 119/204 |

\* cited by examiner

SUSTAINABLE AQUAPONIC SYSTEM AND METHOD FOR GROWING PLANTS LIKE MEDICAL CANNABIS

This is a continuation-in-part of application Ser. No. 14/051,060 filed Oct. 10, 2013 which was a continuation-in-part of Ser. No. 13/279,541 filed Oct. 24, 2011. Application Ser. Nos. 14/051,060 and 13/279,541 are hereby incorporated by reference in its entirety.

BACKGROUND

Field of the Invention

The present invention relates generally to aquaponic systems and more particularly to a system and method of aquaponics using alternative aquaculture feed, fingerling production and green energy sources to yield organic produce as well as edible fish.

Description of the Prior Art

Worldwide fish stocks are dwindling. Slightly more than half the worlds fisheries are known to be fully exploited meaning that their current catch is at or near the maximum sustainable production. Nevertheless, fish consumption has increased to 17.1 kg per person (reported in 2008). Fish are being farmed with some success and a lot of failure. A better technique than straight fish farming is known as aquaponics.

Aquaponics is a farming practice that integrates aquaculture with plant production. The fish in the system produce waste which provides the necessary nutrients for plant production, while, at the same time, the plants help rid the water of fish waste, specifically ammonia, nitrites, nitrates and carbon dioxide while adding back oxygen.

Prior art aquaponics systems as well as straight fish farms have many times been failures since they are typically under pressure to produce as many saleable fish as possible in the shortest possible time. In many cases, ponds are too small for the number of fish; fish are force-fed or fed artificial food to speed up growth that causes disease and death; seasonal changes in water temperature stress or kill fish; fish waste accumulates and is not properly removed; bacteria enter the water that are foreign to the fish population killing fish; or the owner runs out of money before the fish are ready to harvest. Also, many prior art systems are not sustainable in that they cannot continuously operate (some fish farms seed fingerlings, force feed them, and try to harvest as soon as possible). It would be extremely advantageous to have a system and method of sustainable aquaponics that could continuously operate year round (with various factors adjusted during the year based on climate and weather).

Most fish farms or aquaponic systems need pumps and other energy-consuming devices. The energy costs for these devices can be significant. It would be advantageous to have an aquaponic system that derived or recovered a large part of its energy demands from natural sources such as moving water, wind energy, methane digestion, wind, solar, burning wood waste and compost.

One of the most important factors in an aquaponic system is oxygen content in the water (as well as removing carbon dioxide). This is typically accomplished by aeration of the water. In prior art systems, many times aeration is accomplished only by pumping water to a higher elevation and then letting it tumble over rocks or gravel. This is a good method, and If enough water is aerated in this manner, results can be satisfactory; however, there is a large electrical cost for the pumping process. It would very advantageous to have an aquaponic system that used additional alternative aeration methods such as the use of various plants in and near the water like algae and domestic plants such as tomato, basil, lettuce, eggplant, watercress and others, U-tubes and regenerative blowers.

Many prior art systems artificially clean their water. It would be advantageous to have an aquaponic system that uses water from a natural source such as a pond or lake so that fish become inoculated to all the naturally occurring bacteria, parasites and algae found in the natural system.

Prior art aquaponics systems typically use fish waste to provide nutrients for plants. However, the plants were usually limited to those plants that can only live in the water. It would advantageous to have an aquaponic system that could also produce other plants that do not normally live in water, especially edible plants and plants that produce edible fruits and vegetables.

It is now legal in the United States, under a proper license, to grow the plant known as cannabis. While illegal for many years, the states have realized and approved the use of leaves from this plant as a prescription drug for certain patients. Licensees need a way of growing medical cannabis efficiently and in large quantities. An aquaponics farm is an ideal local to grow cannabis and other drug plants. Hemp is a related plant with industrial uses that can also be grown using aquaponics.

SUMMARY OF THE INVENTION

The present invention relates to a system and method of sustainable aquaponics that vertically integrates unique aquaponic system designs with alternative aquaculture fish feed sources, fingerling production methods, alternative aquaculture/farmed fish grow out models, and green energy sources that yield organic produce in the form of fruits and vegetables as well as drug and industrial plants like legal cannabis and hemp.

The present invention can incorporate a raceway system serves as the hub for grow-out throughout the warm and cold months. During the summer months, fish are spawned and fed for steady growth, while during the winter months, the fish continue to grow at slower quite acceptable growth rates. The present invention purposely derives its water from an open, natural, established pond or lake ecosystem to ensure that the raceways are adequately seeded with all of nature's good and bad bacteria, algae, and the like. Additionally, the lake or pond also inoculates, or in essence vaccinates, the raceways and its aquatic occupants with the broad spectrum of bacteria, viruses, parasites, etc. found in nature. The fish and plants grow faster, stronger and are more resistant to disease when exposed to a naturally balance ecosystem found in the pond water or lake water than artificially cleaned water found in the overwhelming majority of aquaculture recirculation systems.

By adjacent or side by side raceway installation, the present invention's water can fall over the long side of the raceway through pea gravel or hadite (expanded shale) to the long side of an adjacent fish raceway. This process provides oxygenation as well as metabolic removal of ammonia and repeats the cycle raceway after raceway until the water empties into the largest grow bed of the system.

The present invention can have a river that typically spans an entire side of the system falling from a large pond down to the another side of the reservoir pond. This water flows down at a rapid pace over large granite stones as well as pea gravel. The surface area provided by the rocks and gravel improves water oxygenation and blows off carbon dioxide.

As a backup to greenhouses and the non-insulated open pond system, the present invention can include winter quarters for the fish that is well insulated and heated to ensure that the fish are comfortable and will continue growing and spawning throughout the winter months. The size of the winter quarters is dependent upon on the number of and type of fish that need to be held over the colder months.

The present invention selectively improves the genetics of the fish, insects, worms and plants grown within the system for disease resistance, high reproduction rates, high growth rates, and high yields.

DESCRIPTION OF THE FIGURES

Several drawings are now presented to illustrate features of the present invention.

Several drawings and illustrations have been presented to aid in understanding the present invention. The scope of the present invention is not limited to what is shown in the figures.

DESCRIPTION OF THE PREFERRED EMBODIMENT

The present invention relates to a system and method of sustainable aquaponics that vertically integrates unique aquaponic system designs with alternative aquaculture fish feed sources, fingerling production methods, alternative aquaculture/farmed fish grow out models, and green energy sources.

Figure 1:
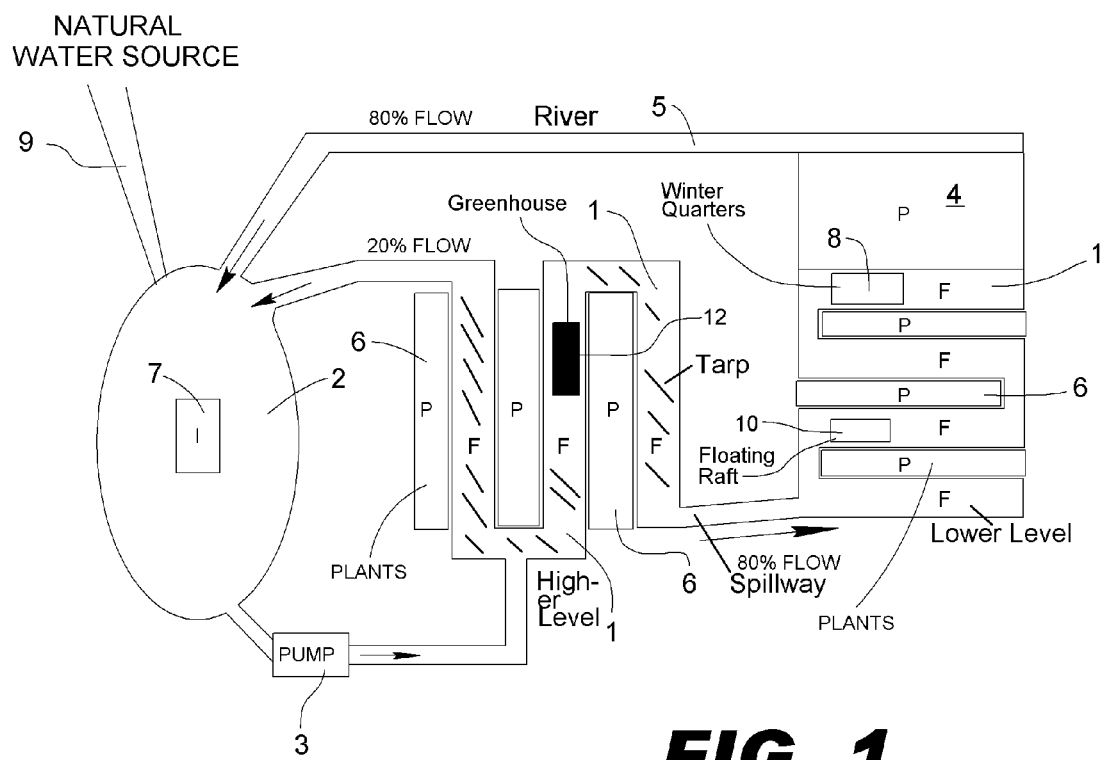
FIG. 1 shows a layout plan for a sustainable aquaponic system according to the present invention.

FIG. 1 shows a layout plan for an embodiment of an aquaponic system according to the present invention. The installation of a system of this type is significantly less costly than that of traditional aquaculture and aquaponic systems currently in production around the world. A man-made raceway system 1 serves as the hub for grow-out throughout the warm and cold months. During the summer months, the fish are spawned and fed for steady growth, while during the winter the fish continue to grow at a slower pace. Depending upon size of the raceway system a small to medium man-made or natural reservoir pond 2 is used within the system. An man-made Island 7 can optionally be placed in the pond 2. The pond allows control of raceway density among other factors. Based upon fish species, raceway fish can be held above 1 pound per gallon because the pond's water volume literally dilutes the metabolic factors of the entire aquaponic system. For example, if the total aquaponic system is 900,000 gallons, and those gallons are divided equally between a ⅓ acre pond and 7 raceways, then a fish like tilapia placed at one pound to the gallon in 450,000 gallons of raceways are only at ½ pound per metabolic gallon because of the 450,000 gallons in the ⅓ acre pond.

Raceways can be around 50' long and 10' wide in a preferred embodiment. However, raceways of any size are within the scope of the present invention. Vertically, a 2-3' fall between raceways is typical. Any fall height is within the scope of the present invention. Plant areas bordering the raceways can typically be around 4' wide. Any width of plant areas is within the scope of the present invention. In some embodiments, a particular raceway may include algae, while others may not. As will be explained, algae is a very desirable component of the system of the invention.

Leading universities teaching aquaculture strongly suggest that the water used in a recirculation system should never be mixed with outside or foreign water sources. The system of the present invention however purposely derives its water from an open, natural, established pond or lake ecosystem to ensure that the raceways are adequately seeded with all of nature's good and bad bacteria, algae, parasites and other life. The lake or pond also inoculates, or in essence vaccinates, the raceways and its aquatic occupants with the broad spectrum of bacteria, viruses, parasites, and the like found in nature. According to the present invention, fish and plants grow faster, stronger and are more resistant to disease when exposed to a naturally balance ecosystem found in the pond water or lake water than artificially cleaned water in the overwhelming majority of aquaculture recirculation systems. An inlet 9 takes water from a natural ecosystem.

The pump or pumps 3 driving the entire aquaponic system pulls its water from the reservoir pond 2. This reservoir pond can help raise or lower the actual temperature of the water in the raceways depending upon the depth of the pump's inlet pipe from the pond. The reservoir pond 2 improves oxygenation within the entire aquaponics because it dilutes the oxygen and metabolic demand on the aquaponic system.

Fourteen to eighteen mil black or white PVC tarp can be used to line the raceways with dimensions ranging from 10'-15' wide by 4'-6' deep by 50'-130' long. The color of the tarp used is dependent desired temperatures within the system as well as annual average ambient temperatures. In many circumstances, the tarp replaces the need for concrete; thereby, greatly reducing the input costs of the entire aquaponic system.

The total gallons of each individual raceway can range from around 10,000 gallons to around over 50,000 gallons. The raceway size can vary based upon the natural terrain of the installation site as well as the installers' desired result of harvestable fish and pounds. There can be one or many raceways within a complete aquaponic system. Installation of raceways is usually in a linear (stair-step or terrace levels) fashion. As previously stated, each adjoining raceway can be designed to be 2'-3' vertically higher than the next raceway. This helps ensure adequate oxygenation to the fish. As the water falls from the vertically higher raceway to the next raceway terrace, the water falls over rocks and other surface area adding significant levels of oxygen to the system. This sequence is designed to occur at every raceway as the water spills over to the next raceway.

Adjacent or side by side raceway installation ensures that the aquaponic system's water will fall over the long side of the raceway through pea gravel or hadite (expanded shale) to the long side of the adjacent raceway. This process provides oxygenation as well as metabolic removal of the ammonia and repeats the cycle, raceway after raceway, until the water empties into the largest grow bed which can be around 50'×110' (the size or presence of the largest grow bed is optional and can vary. Another typical size is 35'×65'). Grow beds 6 can be interspersed between the raceways 1 throughout the system. While FIG. 1 shows some of the water being routed around the grow beds 6, a large quantity of water can pass directly through the grow beds. In some embodiments of the invention, all the water passes through the grow beds from raceway to raceway.

The system according to the present invention typically includes a river 5. This river spans an entire side of the system falling from the largest grow bed 4 down to the side of the reservoir pond 2. This water flows down the river 5 at a rapid pace over large granite stones as well as pea gravel. The surface area provided by the rocks and gravel improves water oxygenation and blows off carbon dioxide.

Recirculation aquaculture systems and aquaponic systems require that the water in the system be pumped, or recirculated, within the system on a continuous basis. The rate of water flow varies by system and is dependent upon items such as the total amount of water in the system, the number of fish or the amount of metabolic waste in the system, the pounds of fish, or density, in the system, the type or species of fish in the system, the oxygen demand on the system, the system's ability to produce oxygen through water movement over surface area, the density of plants within the system, and those plants individual ability to metabolize fish waste. Uniquely, the system of the present invention requires only a single pump 6 to flow the entire system greatly reducing energy demand and overhead costs (a backup pump can be installed in case of failure of the primary pump).

Optionally, a greenhouse 12 can be stacked on top of or near the grow-out raceways. This feature is especially useful and sometimes necessary in arid climates where water supply and evaporation is a concern.

As a backup to greenhouses and the non-insulated open pond system, the present invention can include a winter quarters area 8 for the fish that is well insulated and heated to ensure that the fish are comfortable and will continue to grow and spawn throughout the winter months. The size of the winter quarters is dependent upon on the number of that need to be held over the colder months.

An important optional feature of the present invention is improved genetics of the fish, insects, worms and plants grown within the aquaponic systems for disease resistance, high reproduction rates, high growth rates, and high yields. The selective use of the improved genetics can be very important to success of an aquaponic system.

One of the most serious mistakes made by fish farmers is time. Many failed fish farms try to force-feed and grow fish too quickly possible. Often times the fish farmer is undercapitalized and simply runs out of money before his fish are fully grown or sold. Even worse, many times a large portion or all of the farmed fish will die because of some unintended consequences resulting from overly aggressive timetables. These consequences include:

Unnecessarily stressed fish,
Unnecessarily high feed costs,
Excessively high stocking density ratios,
High and even total death losses, and
Poor or no profit margins.

The present invention reduces the time factor by decreasing the build out or construction costs by as much as 90% compared to other aquaponic system designs; taking advantage of existing land or building ownership. For example, using assets already available such as lakes, ponds, cages, raceways, old hog buildings, and the like, and feeding the fish through naturally occurring feeds and poly-culture (mixed species within one system; i.e., tilapia mixed with crappie, where the tilapia eat duckweed and algae, while the crappie eat the tilapia fingerlings.

Taking a slower, steadier pace actually reduces the aquaponics farmer's demand for capital and constant cash outlay by reducing commercial feed cost by using more natural and alternative feed sources, and cutting energy costs through alternative energy designs in the system, and reducing fingerling costs through prolific tilapia spawning.

The present invention purposely blends many of the available methods of farming fish such as recirculation systems, cage aquaculture, pond aquaculture and the like based upon existing man-made and natural resources (lakes or ponds) in order to reduce system build out costs, daily operational costs, while improving overall efficiencies, increasing sustainability and net profitability.

Figure 2:
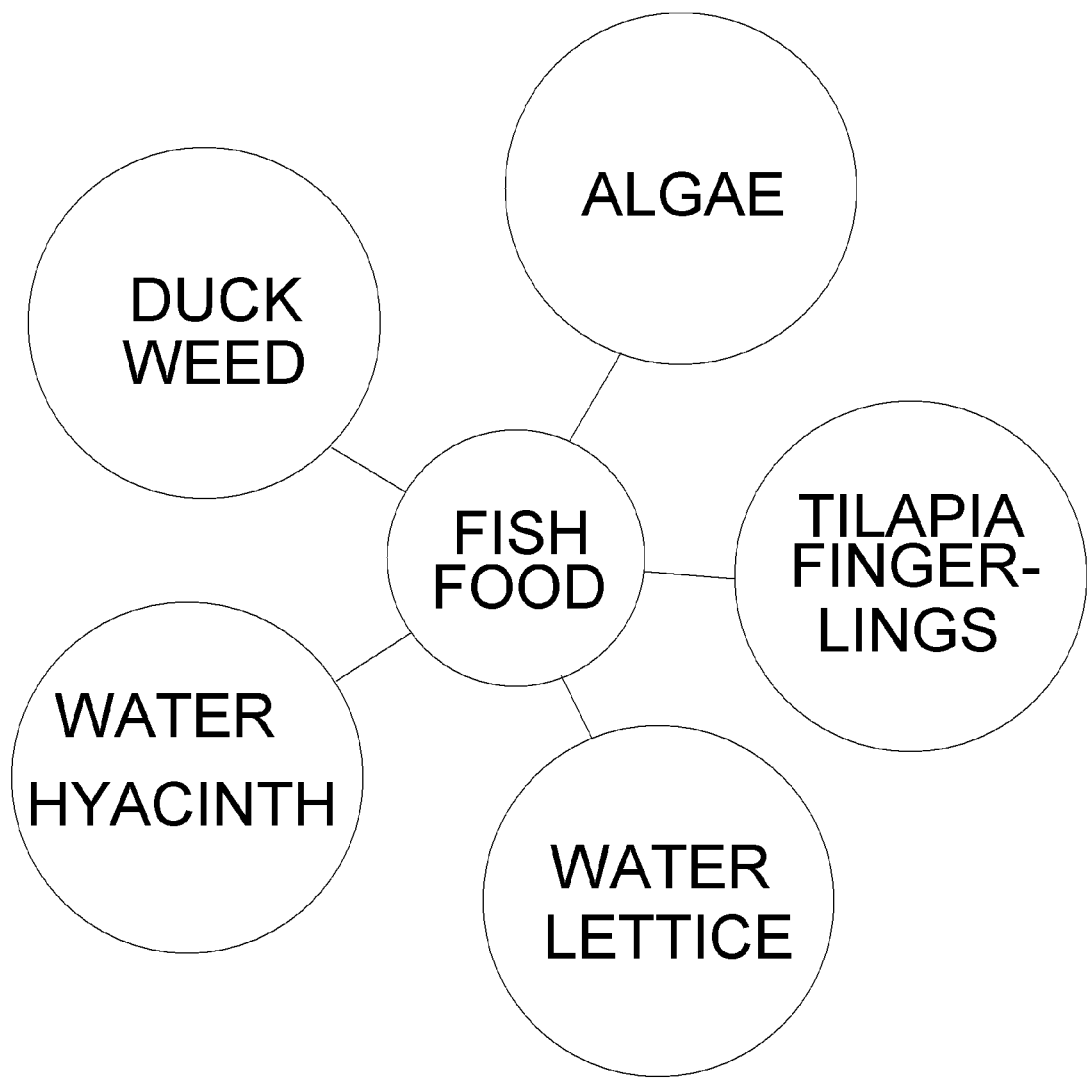
FIG. 2 shows a circle diagram of various fish food grown entirely within the system.

An important feature of the present invention is the method of feeding the fish both by individual species as well as within poly-culture settings. For example, tilapia are omnivores that prefer a plant based diet, while hybrid striped bass are omnivores that strongly prefer a carnivorous diet. Because tilapia are quasi filter feeders and will eat a very broad source of food, tilapia according to the present invention are typically fed the following foods as shown in FIG. 2 based upon nutritional content as well as input costs:

Blue-green algae: This is a naturally occurring, essential food source. Blue-Green algae deliver omega-3 essential fatty acids to their aquatic consumers. The algae are regularly managed from a waste to metabolic removal interval to ensure the highest nutritive value for our fish as well as the most efficient metabolic waste removal from the water system. Blue-green algae delivers up to 61% protein to the fish, and since tilapia are partial filter feeders, they are eating the blue-green algae every time they breathe. The protein cost is $0.00.

Harvested edible grasses, weeds and plant roots that can be an important source of good nutrition to tilapia. The protein cost is typically less than $0.01-$0.02 per pound.

Water Lettuce: This tropical plant is a favorite food of tilapia and offers a protein content around the 24% mark. The protein cost is typically less than $0.01-$0.02 per pound.

Water Hyacinth: This tropical plant delivers a lower protein content to the tilapia, but the tilapia utilize the nutrients from water hyacinth more efficiently making it another valuable feed source. The protein cost is around $0.01 to $0.02 per pound.

Watercress: This native plant is a favorite of the tilapia. Watercress grows quickly and offers about 30% protein content. Watercress can be sold in the Asian markets for up to $2.00 per pound; thus, on a cost-basis feeding it to the tilapia should be done sparingly.

Duckweed: This native plant is a tremendous asset to an aquaponic system. Duckweed's protein content can exceed 35%, and with the appropriate nutrient base, this plant can double its size every day. The protein cost is typically less than $0.01 per pound.

Filamentous Algae: When properly managed, this native plant can also be very useful. The tilapia eat it aggressively, and the protein content can range into the 25-35% area. The protein cost is typically less than $0.01 per pound.

Fava Beans and Cucumbers: Tilapia like to eat these plants resulting in improved grow-out rates when supplementing these plants. These plants can be sold to humans for a fair margin, so these plants are generally used as a supplemental food sparingly. Nevertheless, they steadily to improve the growth rates of the tilapia. The protein cost is typically up to $0.50 per pound.

Bread: Outdated bread is an important source of food for tilapia according to the present invention, especially during the winter months. Bread offers critical amino acids, and is an important source of carbohydrates. The cost is around $5.00 per ton.

Vermiculture: Red worms are prolific breeders and can serve as an important nutritional supplement or vitamin pill to farmed tilapia and gamefish (hybrid striped bass, largemouth bass, bluegill, etc.). The cost is around $0.01-$0.02 per pound.

Insect production: Black Soldier Fly larvae and Dubia Cockroaches also can serve as important nutritional supplements or vitamin pills to the fish. The cost is around $0.03-$0.04 per pound.

Forage Fish: These fish naturally serve as a food source for natural and farmed gamefish. An example of a forage fish includes fathead minnows or emerald shiners. Commercially caught threadfin and/or gizzard shad are also excellent naturally occurring forage fish. Shad can be commercially harvested and substituted as a food source for farmed gamefish. The cost of either tilapia or shad is typically less than $0.10 per dehydrated pound, which is approximately $0.60 per pound cheaper than commercial 41% fish feed. The shad also offers a complete food to the top predator fish such as the largemouth bass and hybrid striped bass; thereby, making the shad better feed for farmed fish than a commercially prepared diet. Additionally, the present invention can include frozen shad feeders.

Figure 3:
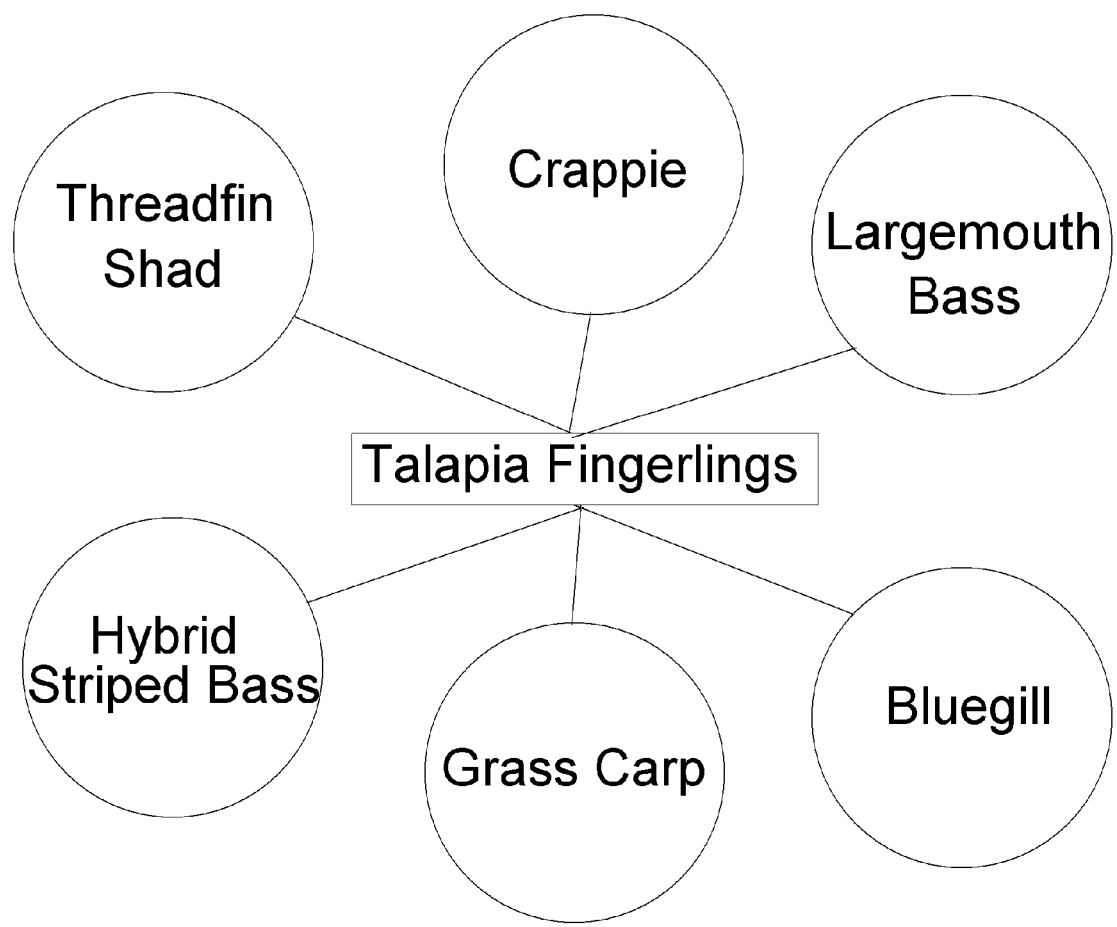
FIG. 3 shows a circle diagram of using tilapia as a food source.

It is important to note that tilapia can purposely become a forage fish when poly-cultured with more expensive farmed gamefish like crappie, largemouth bass and hybrid striped bass. Due to the prolific spawning rates of tilapia, the present invention can enjoy surpluses of tilapia fingerlings. These fingerlings can be raised in the same ponds and lakes with the expensive gamefish. The tilapia out-produce the predation from the gamefish; thereby, yielding a surplus of tilapia in the ponds after they have successfully fed the predatory fish for a growth season. Some of the premium fish species that can eat tilapia fingerlings are shown in FIG. 3 and include grass carp, hybrid striped bass, threadfin shad, largemouth bass, bluegill and crappie.

The omega-3 content of harvested fish is essential to our products' long term marketing, distribution and sales price strategy. The present invention generally yields a fish that is naturally higher in omega-3 content than omega-6 content. The majority of commercially prepared fish feeds, especially the cheaper fish feeds are very high in omega-6 fatty acids because these feeds are made primarily from corn and soybeans. This yields fish higher in omega-6 fatty acids than omega-3's. The feed model of the present invention uses a blend of naturally occurring blue-green algae which is very high in omega-3 essential fatty acids, as well as the fish forage fish that feed upon those omega-3 algae such as the threadfin shad. The shad contains the highest level of omega-3 essential fatty acid of any fish in North America. Thus, fish according to the present invention are better products than any farmed fish fed/raised on corn or soybean based feed. A consumer product that offers a natural source of omega-3 essential fatty acids is highly marketable to the premium consumers, and its front-label placement on consumer packages is permitted under FDA labeling guidelines without any special FDA permits or reviews because it is a naturally occurring substance.

As previously stated, the aquaponics farm of the present invention is ideal to grow plant drugs such as legal (licensed) cannabis or hemp. The fish provide the nutrients to the plants. The growth rate of the plants is exceptionally high. For example, the traditional ways to grow cannabis (grow lights in a basement) yields about ½ pound of buds per plant, while hydroponics yields one to two pounds of buds per plant, the aquaponics of the present invention yields up to five pounds or more of buds per plant (with a typical yield of between four and five pounds per plant). Hemp yield is also very good. This has also been shown with tomato plants. An average tomato plant grows to three-four feet tall, while the aquaponic plants according to the present invention have been measured at over 16 feet tall. In growing legal cannabis is that the states limit the number of plants per patient per license, so a very important element in cannabis production is the volume of flower buds per plant. Five pounds or more per plant means far more income for the grower than one-two pounds per plant. In addition, the grow out operation with aquaponics does not use any chemicals or add anything—it is all natural. Traditional grows and hydroponics require constant addition of fertilizers, herbicides, pesticides and fungicides.

Figure 4:
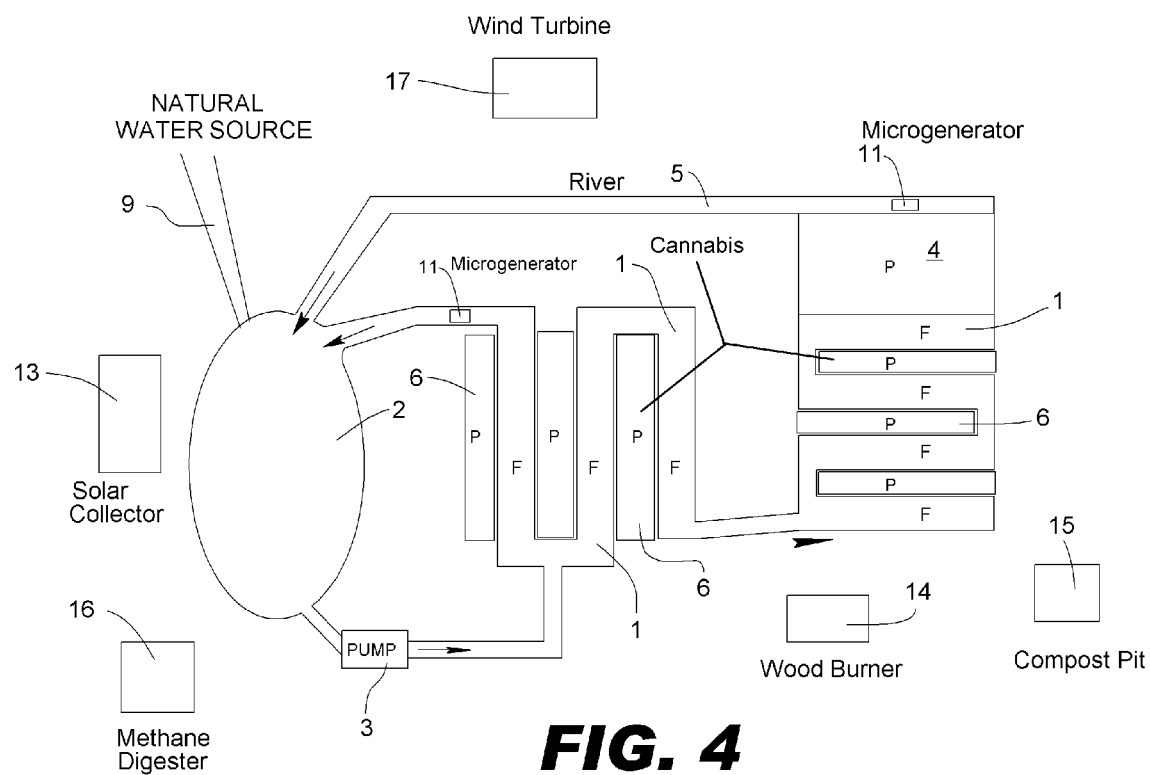
FIG. 4 shows a layout plan using energy recovery techniques.

Energy costs are high in any aquaculture operation. Thus, the use of incremental alternative energy sources by the present invention is important. FIG. 4 shows the use of some of these sources. Usually, the energy created within the system can be stored in deep-cell batteries in 12V and 24V systems tied to 120V power inverters. A typical installation may use as little as 22 Amperes with all pumps and lights on. The types of energy sources utilized are as follows:

Micro hydro generators 11—The present invention has a significant amount of constant water flow, and simply placing Pelton wheel electric generators in key locations within the water flow generates incremental sources of electricity.

Ram Hydraulic Pumps—placement of ram pumps within the flowing water creates two opportunities:

Pelton wheel micro hydro generators.

Aeration through the constant fill and bell siphon emptying of a tank placed at the beginning of each raceway.

Methane digesters 16—combining natural carbon and nitrogen sources in a 3:1 ration yields a significant amount of methane gas for energy production in the form of heat or electric generators. In addition to methane gas production, a methane digester yields excellent sources of organic fertilizer and cellulose bedding.

Wind 17—Vertical Turbine Electric Generators can be cheaply built out of plastic 55 gallon drums. Based upon natural wind flow, the turbines provide steady incremental sources of usable energy.

Wood 14—The Midwestern United States offers a significant source of wood waste and debris for burning. Several methods of utilizing wood waste with the system are as follows:

Rocket Stove: A rocket stove forces air through a burn chamber yielding a much more efficient use of the wood providing higher heat output to be delivered to a greenhouse or the like. A rocket stove burns efficiently enough to leave the stove's exhaust pipe within the greenhouse. This yields better heat conversion within the greenhouse and small, safe amounts of carbon dioxide gas within the greenhouse for improved organic plant production.

As supplemental energy is needed, a Sterling Steam Engine can be placed on top of a rocket stove where the highest heat production is delivered. The Sterling Steam Engine can turn an electric generator for more power creation.

A 1" copper tube (or similar) can be wrapped several times (10-20 times) around the body of a rocket stove to yield temperatures well over 600 degrees F. During the winter months, a low ampere, low gallon per minute (3-6 gpm) circulation pump can pump cooler water out of the raceways and into the 600 degree copper tube of the rocket stove returning heated water back to the raceways. The copper tubing thus serves as a heat exchanger between the rocket stove and the raceway helping to maintain the temperature of the raceway during winter months.

Compost 15: A compost pile can offer many valuable services to the organic farmer. Regarding energy, the present invention can use one or more compost piles to elevate the raceways' water temperatures. The preferred method is the recirculation of raceway water through PEX pipe from the raceway and back to the compost pile and then back into the raceway. Grass clippings or horse manure are the preferred sources of compost since they will generate enough energy to heat the pile to approximately 180 degrees F. A low amperage, low gallons per minute (gpm) pump can slowly circulate raceway water through the compost pile for heat will exchange and return the water to the raceway. Steady maintenance of the compost pile yields free sources of heat throughout the colder months.

Mass Energy Storage: Water and stone serve as excellent energy (heat) storage batteries. During winter months, solar heat can be stored in 55 gallon barrels full of water or stones lying on the ground. These barrels are most effective if placed on the south facing wall of a greenhouse or the like. Additionally, any heat found within the ceiling can be blown with a solar fan down into a mass energy storage bank below the ground. For example, a typical installation enjoys a storage bank in the form of 250,000 pounds of bowling ball sized rocks buried from 4' underground to within 1 foot of ground level. These rocks absorb heat blown in from the greenhouse, hold the heat throughout the day, and release this stored energy up through the ground and into the greenhouse throughout the night as the ambient temperature drops.

Solar 13: The effectiveness of solar energy is dependent upon longitude and latitude. A farm based in the United States in Indiana for example may not anticipate large amounts of solar energy. However, a farm located in Amman, Jordan would enjoy tremendous amounts of storable solar energy.

System aeration or oxygen content can be a critical element when rearing fish. The aquaponics system of the present invention is designed to add oxygen to the system whenever possible:

Flowing water: The water flows throughout the system through and over gravel beds, narrowed raceways, large rock formations and over waterfalls. Every time the water moves across an uneven surface it picks up oxygen and liberates or alters elements like carbon dioxide, iron to iron oxide and hydrogen sulfide. Without supplementation, a system according to the present invention can be supersaturated with over 8.3 ppm of oxygen allow the fish to live in a very healthy environment. Monitoring equipment can continuously monitor the dissolved oxygen content of the water at various locations.

Plant production: The blue-green algae of the present invention consumes carbon dioxide and exhales oxygen. Controlled algae blooms are highly desirable as both an oxygen generator and essential food source for our herbivorous fish. Organic produce (tomato, basil, lettuce, eggplant, watercress, and more) grown throughout the gravel beds constantly improve the system's water's ability to improve oxygen levels by metabolizing nitrate levels, hosting the bacteria that convert ammonia from fish waste to nitrite and nitrate, as well as consuming carbon dioxide and exhaling oxygen into the system.

The U-Tube: When necessary, a U-Tube can be added for additional oxygenation or super-saturation of the system water. These inexpensive devices can be important when increasing the fish densities above the normal limits of 0.5 to 1.0 pounds of fish per gallon of water.

Regenerative Blowers: The present invention installs oxygen diffusers and soaker hoses wherever fish are placed in the system, especially the raceways. The regenerative blower is a supportive back up aerator to standard water flow when fish are stressed or during pump failure. Properly placed regenerative blowers add approximately 2-3 ppm of oxygen to the total system water Organic Plant Production: Plant production within the system is very important for the removal of waste and the introduction of additional oxygen. The present invention provides:

constant water flow through either pea gravel or hadite grow-beds without siphons;

the installation of floating raft 10 systems either through the use of organically approved flotation devices/rafts or through the use of floating native plants as the actual raft. The floating plants serves as a raft for the plants and a source of food for the herbivorous fish.

Organic plant production in an of itself is an important part of the cash flow model of the present invention. The plants not only generate significant revenues in themselves, but also produce bio-filtration substrates via the gravel bed and root systems that permit fish placement to at least 1 pound of fish per 1 gallon of water throughout the entire system. Not only do the plants generate significant cash flow, but they also ensure the maximum amounts of fish production within a recirculating system.

Several descriptions and illustrations have been presented to aid in understanding the present invention. One with skill in the art will realize that numerous changes and variations can be made without departing from the spirit of the invention. Each of these changes and variations is within the scope of the present invention.

I claim:

1. A sustainable aquaponics system comprising:
a man-made pond connected by a pump to a plurality of man-made raceways, each raceway lined with tarp and containing a variety of plant species including blue algae placed in the raceway to remove waste materials from raceway water and provide food for fish, wherein each raceway spills water through a man-made spillway into an adjacent raceway at a lower vertical level;
a source of water from a natural ecosystem feeding into said man-made pond;
at least one insulated and heated winter quarters for fish in colder temperatures;
a poly-culture fish population wherein chosen predator fish eat other chosen fish in the system in a food chain wherein lower members in the food chain spawn faster than they are consumed by predator fish higher in said food chain;
wherein said system includes monitoring equipment adapted to ascertain that water contains at least 8.3 ppm of dissolved oxygen;
a plurality of man-made plant growing areas adjacent to or on said raceways, at least some of said plant growing areas producing legal cannabis with a yield of four to five pounds of buds per plant or hemp;

a plurality of micro-electric generators situated in said raceways producing electricity from moving water, said electricity used to partially power said pump.

2. The sustainable aquaponic system of claim 1 further comprising at least one of wind energy generators, solar energy panels, wood burning energy furnaces or compost generated energy pits.

3. The sustainable aquaponic system of claim 1 further comprising at least one floating raft either using organically approved flotation devices or floating native plants.

4. The sustainable aquaponic system of claim 1 wherein shad is used as food for predator fish.

5. The sustainable aquaponic system of claim 1 wherein all of said plant growing areas are used to produce legal cannabis.

6. The sustainable aquaponic system of claim 1 wherein adjoining raceways are vertically offset by 2-3 feet and configured so that water spills from higher raceways to adjacent lower raceways.

7. The sustainable aquaponic system of claim 6 wherein the water spills through pea gravel or hadite.

\* \* \* \* \*